Aug. 9, 1955   J. CASTRONUOVO   2,714,861
MANICOTTI PRODUCING MACHINE
Filed Jan. 11, 1954
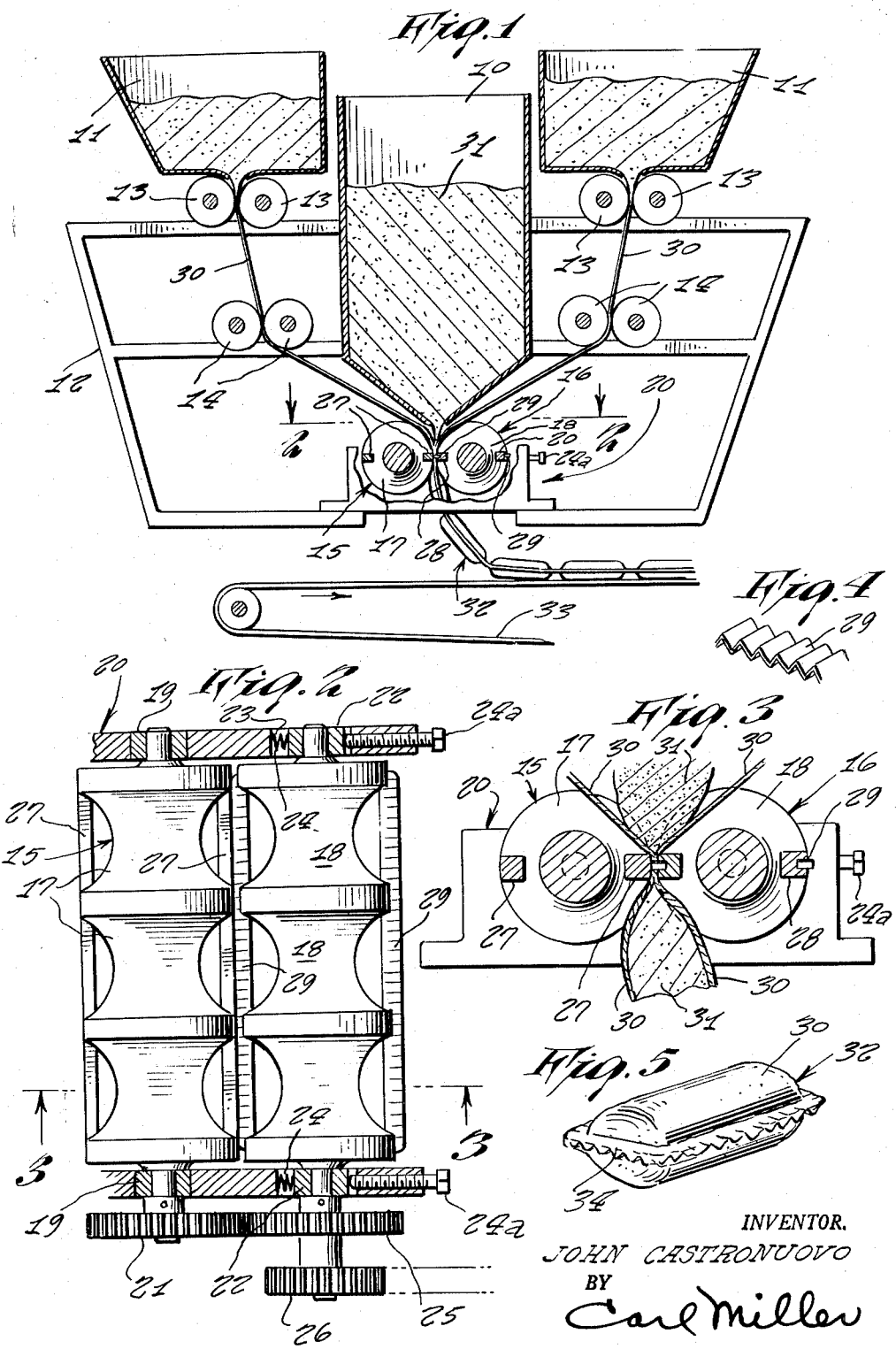
INVENTOR.
JOHN CASTRONUOVO
BY
Carl Miller
ATTORNEY

United States Patent Office 2,714,861
Patented Aug. 9, 1955

2,714,861

MANICOTTI PRODUCING MACHINE

John Castronuovo, Brooklyn, N. Y.

Application January 11, 1954, Serial No. 403,191

2 Claims. (Cl. 107—21)

This invention relates to manicotti producing machines.

It is an object of the present invention to provide a machine which will produce manicotti, effecting an economy of time and labor over methods previously employed and producing a more perfect product.

Other objects of the present invention are to provide a manicotti machine bearing the above object in mind which is of simple construction, inexpensive to manufacture, has a minimum number of parts, is easy to use and efficient in operation.

For other objects and a better understanding of the invention, reference may be had to the following detailed description taken in connection with the accompanying drawing, in which:

Figure 1 is a vertical sectional view of a manicotti producing machine and showing the invention incorporated thereon;

Fig. 2 is a transverse sectional view taken along the line 2—2 of Fig. 1;

Fig. 3 is a vertical sectional view taken along the line 3—3 of Fig. 2;

Fig. 4 is a fragmentary perspective view of a portion of the knife; and

Fig. 5 is a perspective view of the manicotti product produced by the machine.

Referring now more in detail to the drawing, there is shown in Fig. 1 a manicotti producing machine including a central gravity feeding hopper 10 containing a prepared filling, and oppositely disposed dough tanks 11 suitably mounted on the frame 12 of the machine alongside the hopper 10. The usual primary rollers 13 are disposed on opposite sides of the openings in the tanks 11 and feed the dough to the secondary rollers 14 from whence the dough is directed to the outlet of the prepared filling hopper 10 and between the manicotti dies 15 and 16.

Each of the dies 15 and 16 (Fig. 2) is provided with three cooperating concave portions between which the prepared filling and dough pass to produce a product having an elliptical cross section, these concave portions being designated as 17 and 18, respectively. The ends of the die 15 are rotatably mounted in bushings 19 provided in the ends of a pillow block 20, one end of the die 15 being elongated and having keyed thereon a gear 21. The ends of the die 16 are located in bushings 22 (Fig. 2) which move horizontally in elongated slots 23 provided in the ends of the pillow holder or block 20, springs 24 being provided on one side of the bushing 22 while the set screws 24a are screw threaded into the pillow block with the inner ends thereof in abutment with the bushing 22. Thus, the die 16 may be adjusted relative to the die 15 in an easy and ready manner. A gear 25 equal in diameter to the gear 21 is keyed onto the extended end of the die 16 in mesh with gear 21. A driver gear 26 is likewise keyed onto the same shaft as gear 25 and receives the input drive from a suitable source of power, not shown. Each of the dies 15 and 16 are provided with oppositely disposed, longitudinally extending cross bars 27 and 28 respectively, the cross bars being embedded in the peripheries of the dies. Each of the cross bars 28 has embedded therein a pleated knife 29 which extends outwardly therefrom and is adapted to bear against the corresponding cross bar 28 when the rollers are in the position of Fig. 3. The cross bars 27 and 28 are milled on the surface and the pleated knives 29 cut the product as it revolves with the opposite cross bar 27.

In operation, when two sheets of noodle or macaroni dough 30 are fed into the center of the dies 15 and 16, and a prepared filling 31 is forced into the center of the sheets 30, a tubular product 32, called manicotti, is formed and passes downwardly onto the conveyor belt 33. The manicotti is already filled and ready to cook. This product is shown in Fig. 5. The periodic abutment of the pleated knives 29 with the opposite cross bar 27 forces the formation of the pleated portion 34 (Fig. 5) surrounding the product. The above device thus provides manicotti of a more uniform design and effecting an economy of time and labor over previous methods of forming the product.

While various changes may be made in the detail construction, it shall be understood that such changes may be made in the spirit and scope of the present invention as defined by the appended claims.

Having thus set forth and disclosed the nature of my invention, what is claimed is:

1. In a manicotti producing machine a pair of parallel, substantially cylindrical dies, a bearing at each end of the said dies and the latter being rotatably mounted in the said bearing, means for turning the said dies in opposite directions, each of said dies having cooperating concave portions disposed opposite each other and adapted to receive dough and filling therebetween, oppositely disposed cross bars extending longitudinally on each of said dies and embedded in the outer peripheries thereof, a pleated knife being embedded in one of said cross bars on one of said dies extending outwardly therefrom and engaging the cross bar of said adjacent die during rotation of both said dies.

2. The machine, as set forth in claim 1, in which the said bearing for the said dies includes a bushing, each of the said dies has at both ends a shaft extension received by the said bushing, and the bearing for one of the said dies has a slot disposed in a plane extending through the rotating axis of both said dies, said bushing of the last mentioned die being adjustably mounted in the said slot in order to vary the distance between the said dies, and resilient means engaging said last mentioned bushing on one side and screw means extending through the said bearing and engaging said bushing on the other side for setting a predetermined distance between the said dies.

References Cited in the file of this patent

UNITED STATES PATENTS

| | | |
|---|---|---|
| 1,970,396 | Scherer | Aug. 14, 1934 |
| 2,001,792 | Tombi | May 21, 1935 |
| 2,152,101 | Scherer | Mar. 28, 1939 |
| 2,227,728 | Lombi | Jan. 7, 1941 |